US006486994B1

(12) United States Patent
Giles

(10) Patent No.: US 6,486,994 B1
(45) Date of Patent: Nov. 26, 2002

(54) MULTI-DIRECTIONAL INFRARED PORT AND METHODS OF USING SAME

(75) Inventor: Rick D. Giles, Sandy, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/170,964

(22) Filed: Oct. 13, 1998

(51) Int. Cl.$^7$ .............................................. H04B 10/10
(52) U.S. Cl. ..................................... 359/163; 359/172
(58) Field of Search ................................ 359/172, 163, 359/152, 159; 439/131; 361/737, 741, 752, 754, 756

(56) References Cited

U.S. PATENT DOCUMENTS

| | | | | |
|---|---|---|---|---|
| 4,727,600 A | * | 2/1988 | Avakian | 359/159 |
| 5,513,074 A | * | 4/1996 | Ainsbury et al. | 361/737 |
| 5,561,727 A | * | 10/1996 | Akita et al. | 385/88 |
| 5,600,471 A | * | 2/1997 | Hirohashi et al. | 359/152 |
| 5,736,782 A | * | 4/1998 | Schairer | 257/679 |
| 5,781,405 A | * | 7/1998 | Vossler | 361/686 |
| 5,852,517 A | * | 12/1998 | Gerber et al. | 359/811 |
| 5,861,968 A | * | 1/1999 | Kerklaan et al. | 359/152 |
| 5,861,969 A | * | 1/1999 | Yasuda | 359/152 |
| 5,894,425 A | * | 4/1999 | Saliba | 364/708.1 |
| 5,917,630 A | * | 6/1999 | Kadowaki et al. | 359/142 |
| 5,920,177 A | * | 7/1999 | Davis | 320/114 |
| 6,081,356 A | * | 6/2000 | Branc et al. | 359/118 |
| 6,115,160 A | * | 9/2000 | Anzai et al. | 359/152 |
| 6,115,161 A | * | 9/2000 | Cho | 359/152 |
| 6,266,017 B1 | * | 7/2001 | Aldous | 343/702 |

* cited by examiner

Primary Examiner—Leslie Pascal
(74) Attorney, Agent, or Firm—Workman, Nydegger & Seeley

(57) ABSTRACT

Methods and apparatus for wirelessly communicating between a master and slave device with multi-directional infrared transmissions are provided. The master device is equipped with a multi-directional infrared (IR) port in the form of either a PCMCIA communications card, an infrared domed housing or a plurality of IR ports, positioned multi-directionally, about a computing system configuration. The IR port has a plurality of IR pairs, infrared isolated therebetween, comprised of an infrared transmitter and receiver. From the master device, each of the IR transmitters transmit an attention pulse in a wide-angular pattern in a singular plane to attract the attention of the slave device regardless of its physical placement in relation to the master device. In response to the attention pulse, the slave device sends a reply. Thereafter, the reply is evaluated at each of the IR pairs according to various criteria to select the IR pair or pairs best suited for infrared communications with the slave device. Preferably, the IR pair is selected so that the most accurate, fastest and/or strongest signal strength communications are effectuated between the master and slave devices. Once the IR pair providing the desired infrared communication characteristic is selected, the physical placement of the slave device is stored and associated with that IR pair. Storage is preferably performed by a look-up table so that during subsequent communications between the master and slave device, the preferred IR pair can be quickly selected and communications established in a fast manner. A protocol for communicating between this invention and conventional devices is also described.

13 Claims, 5 Drawing Sheets

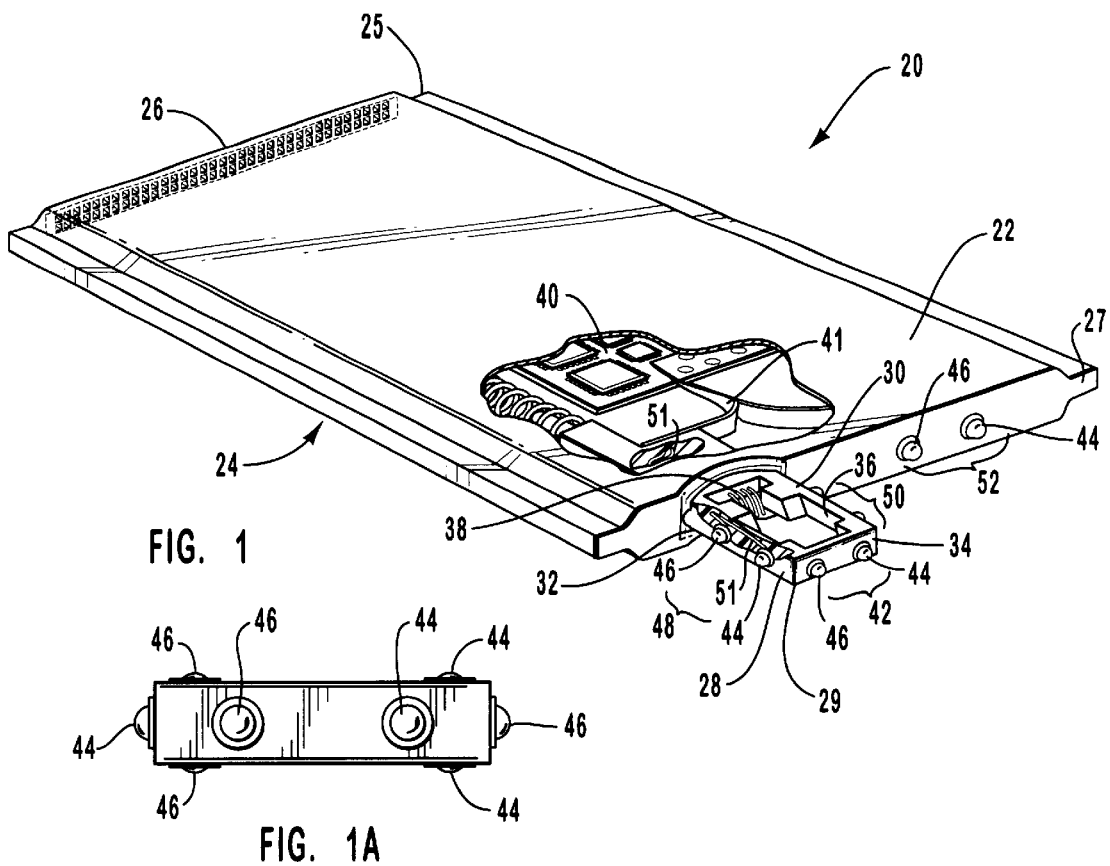
FIG. 1
FIG. 1A
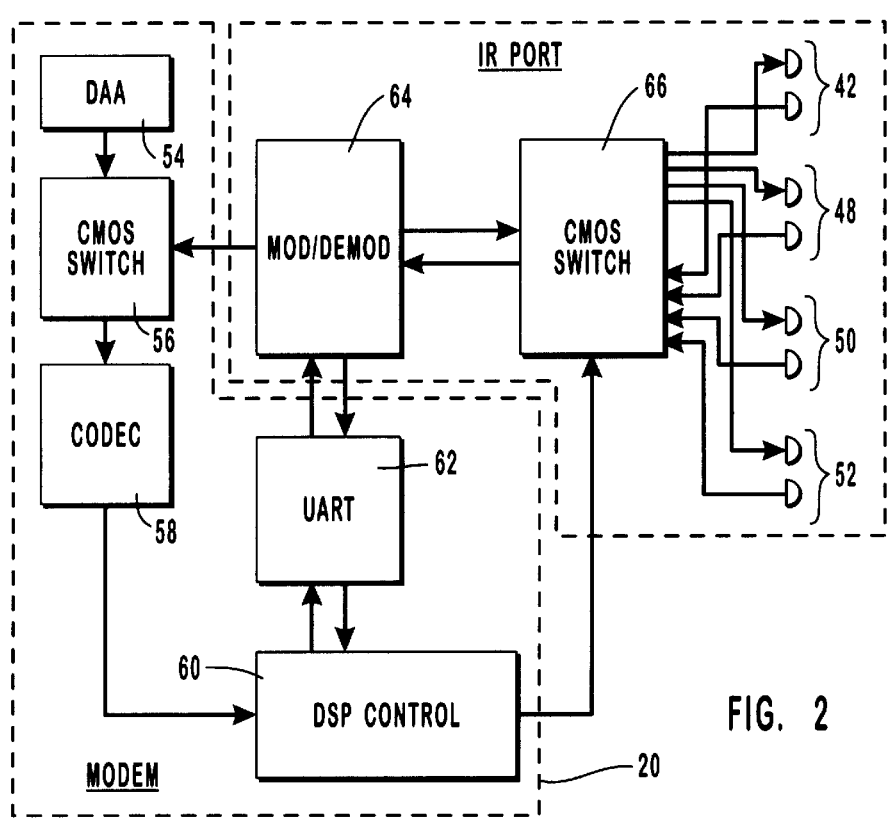
FIG. 2

MULTI-DIRECTIONAL INFRARED PORT AND METHODS OF USING SAME

BACKGROUND OF THE INVENTION

1. The Field of the Invention

The present invention relates generally to wireless networks. More specifically, the present invention relates to devices networked together by an infrared link. Even more specifically, the present invention relates to methods and apparatus for communicating between peripheral devices via multi-directional infrared transmissions.

2. The Relevant Technology

Infrared (IR) transmission is wireless communication over a relatively small area, using infrared components to transmit and receive signals. Infrared transmissions require line-of-sight connection between the transmitter and receiver or between each of these and a common target. Line-of-sight connection usually means about 1 meter in centerline distance between communicating IR ports with a field-of-view of about ±30° therefrom.

One problem, however, is that achieving line-of-sight connection is often inconvenient. For example, many infrared ports, i.e., an infrared transmitter and receiver pair, are assembled into personal computers (PC) for communicating with a peripheral device, such as a personal data assistant (PDA), along a base portion of the PC on a side behind the flip-up display screen. Then, if the PC is positioned on a desktop facing a wall, as commonly occurs, the PDA would need to be positioned generally between the wall and PC in order to allow IR transmissions to transpire.

Moreover, this becomes impracticable in other computing environments, such as in planes and automobiles, because PC's are placed on human laps and are pinched between other humans, adjacent seats, doors, etc., and little if any physical berthing exists for placing another device with an IR port into a line-of-sight arrangement. Consequently, achieving communications between IR ports is a function of having adequate space to arrange the ports so that critical juxtapositioning therebetween can be achieved.

Another problem is that many devices which contain software, or are able to implement software suitable for communicating via IR transmissions, are not presently configured with any IR ports. Some conventional retrofitting devices, however, do address this problem. Yet, these are expensive and/or have complex or burdensome interfacing requirements such as awkward platforms, excessive cabling and onerous mating connectors.

In general, IR transmission signals are either focused or diffuse. A focused signal is aimed directly at its recipient whereas a diffuse signal disperses and travels in multiple directions. As such, to achieve greater range focused signals are required, but with focused signals comes the requirement of critical juxtapositioning of the communicating IR ports. Whereas, to achieve greater field-of-view and looser alignment between communicating IR ports, diffuse signals are required. With diffuse signals, however, the ports must be closer.

Accordingly, it would be an advance to provide improved IR ports that overcome the foregoing alignment, power and retrofitting disadvantages.

OBJECTS AND SUMMARY OF THE INVENTION

It is, therefore, an object of the present invention to provide a multi-directional IR port that is economically and easily adapted to a variety of existing computing system configurations.

It is another object of the present invention to provide a multi-directional IR port having advantage over conventional ports with greater range while allowing for less critical juxtapositioning during infrared communications.

It is still another object of the present invention to provide a multi-direction IR port allowing flexibility in berthing requirements between communicating devices when achieving line-of-sight connections.

In accordance with the invention as embodied and broadly described herein, the foregoing and other objectives are achieved by providing methods and apparatus for wirelessly communicating between a master and slave device with multi-directional infrared transmissions.

In a preferred embodiment, the master device is equipped with a multi-directional infrared (IR) port in the form of either a PCMCIA communications card, an infrared domed housing or a plurality of IR ports, aimed multi-directionally, about a computing system configuration. In general, the IR port has a plurality of IR pairs, infrared isolated therebetween, comprised of an infrared transmitter and receiver. From the master device, each of the IR transmitters of each IR pair transmits an attention pulse in a wide-angular pattern in a singular plane to attract the attention of the slave device, regardless of its physical placement in relation to the master device. In response to the attention pulse, the slave device sends a reply. Thereafter, the reply is evaluated at each of the IR pairs according to various criteria to select the IR pair or IR pairs best suited for infrared communications with the slave device. Preferably, the IR pair(s) are selected so that the fastest, most accurate and/or strongest signal strength communications are effectuated between the master and slave devices.

Once the IR pair providing the desired infrared communication characteristics is selected, the physical placement of the slave device is stored and associated with that IR pair. In this manner, since these devices are infrequently moved in relation to one another, future infrared transmissions between the master and slave device are quickly accomplished because the physical relation to one another is known and stored. The association between master and slave device is preferably stored in a look-up table to which the master device has readied access. Thereafter, the other IR pairs are inactivated and infrared transmissions of data between the master and slave devices are performed.

It is a feature of this invention that devices not equipped with infrared transmission capabilities are easily and readily retrofitted with either of the foregoing apparatus in order to economically and efficaciously achieve infrared transmissions.

It is another feature of this invention that because each of the IR pairs are infrared isolated from one another, substantially simultaneous infrared transmissions may occur between a plurality of uniquely addressed peripheral (slave) devices. Substantially simultaneous infrared transmissions are also attainable by multiplexing the biasing of each of the IR pairs.

It is still another feature of this invention, in the event that either the master or slave is not equipped to communicate with this style of infrared transmissions, that each device may downgrade to conventional infrared transmission technologies. Preferred troubleshooting procedures are also described in the event the master cannot locate the slave device.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which:

FIG. 1 is a perspective view of a multi-directional infrared port configured jointly with a PCMCIA Type II modem having an XJACK® connector in accordance with a preferred embodiment of the present invention;

FIG. 1A is a front view of an alternative embodiment of a multi-directional infrared port configured jointly with a PCMIA Type II modem illustrated in FIG. 1, containing infrared transmitters and receivers on both the sides, front face, top and bottom surfaces of the infrared port.

FIG. 2 is a diagram of exemplary circuitry useful with the multi-directional infrared port of FIG. 1;

DETAILED DESCRIPTION OF THE PREFERRED EMBODIMENTS

Figure 3:
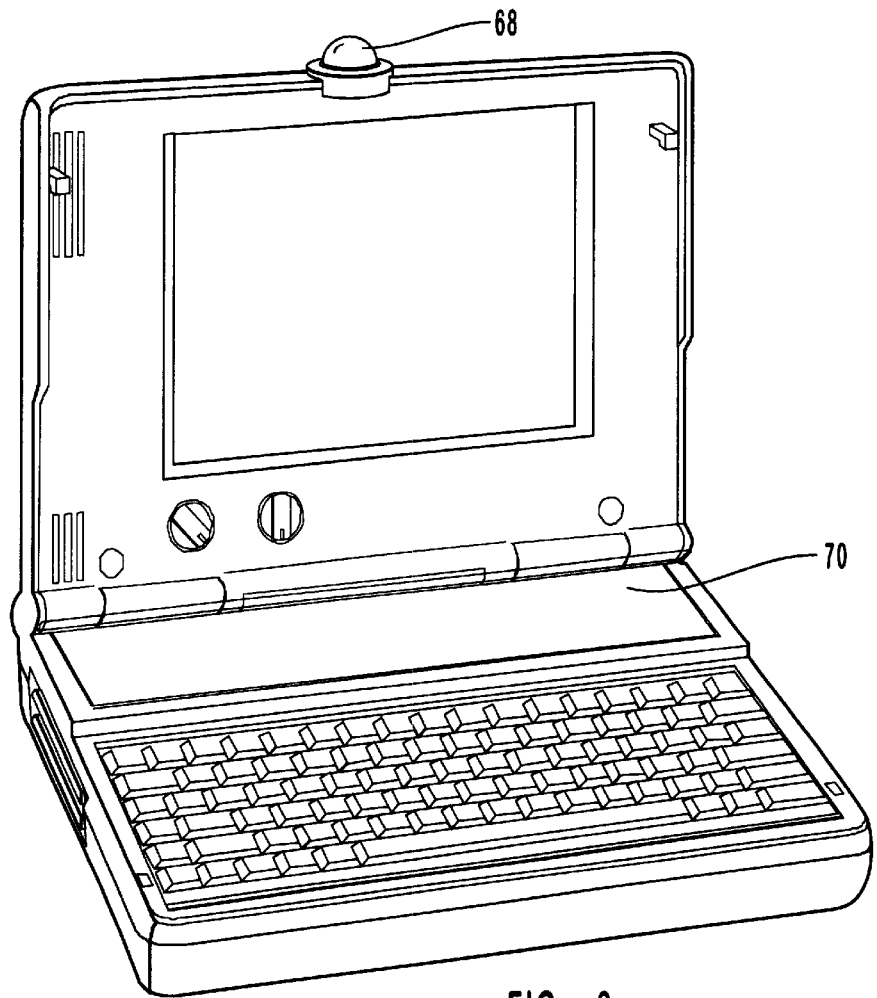
FIG. 3 is a perspective view of a multi-directional infrared port configured jointly with a personal computer in accordance with another preferred embodiment of the present invention.

The present invention provides methods and apparatus for wirelessly communicating amongst a plurality of devices configured for multi-directional infrared transmissions. It is a feature of this invention that devices not equipped with infrared transmission capabilities are easily and readily retrofitted with means for infrared transmissions. It is another feature of this invention that with these apparatus, methods for determining the strongest signal strength, the most accurate or the fastest communications between devices can be determined to afford enhanced infrared communications.

In a preferred embodiment, the foregoing is achieved by providing a multi-directional infrared port adapted for use with personal computers. With reference to FIG. 1, a communications card, generally as 20, is configured as a Personal Computer Memory Card International Association (PCMCIA) type II architecture styled modem generally rectangular in shape with an upper and lower planar surface 22, 24 having well known dimensions of about 85.5 mm in length by about 54 mm in width by about 5.5 mm in thickness (type I and type III cards are about 3.3 mm and about 10.5 mm in thickness, respectively).

Ultimately, the communications card 20 of this nature is used to provide data transferring capabilities between a computing system configuration, such as a PC, and a communications line. To accomplish this, at one end 25 of the communications card 20 is a connector 26 for electrically interfacing with the PC. At the other end 27 is a means for interfacing with a media connector, which in turn, is connected to the communications line.

The interface between the PC and the communications card typically occurs within the PC in a communications card slot thereof. In accordance with PCMCIA standards, the connector 26 is a 68 pin connector well known to those skilled in the art. The connector, however, may additionally be any connector type suitable for interfacing between a communications card and a PC.

The means for interfacing with a media connector are varied and numerous. In a preferred embodiment, the means include a media connector port, generally as 28, configured herein as a commercially available, slidable or "pop-out" style port, known commonly as the XJACK® connector initially produced by MEGAHERTZ Corp., now owned by 3 Com Corp.

This media connector port 28 has a top and bottom planar surface 30, 32, separated by a thickness 34, whose periphery thereof is configured in a generally rectangular shape. Together, this forms a retractable access portion 29 of the communications card 20. In means well known in the art, an aperture 36 is formed in the retractable access portion having a size and shape so formed so as to accept a portion of a media connector, such as an RJ-xx style connector like the RJ-11 or RJ-45, in a vertical docking manner. At least one contact wire 38 is introduced into the aperture 36 to afford electrical connection capabilities between the retractable access portion and a fixed portion 40 of the communications card. The fixed portion 40 is generally the printed circuit board (PCB) having various hardware electronic devices thereon facilitating the transfer of data from the PC over the communications line.

An electrical connection means 41, such as the depicted ribbon cable, provides the electrical connection between the retractable access portion and the fixed portion. Discrete wires, wire bundles, sliding contacts, flexible ribbons, etc. may also be used as the electrical connection means.

Although not shown, the fixed portion is electrically connected to the connector 26 to ultimately afford electrical coupling between the host computing system configuration, e.g., the PC, and the retractable access portion.

During use, the retractable access portion is capable of being retracted into and extend from between the upper and lower planar surfaces by extending from a retracted position (not shown) substantially within the upper and lower planar surfaces to an extended position (shown in FIG. 1) by simply pressing against thickness 34. In this manner the aperture 36 moves from a substantially confined position to a substantially exposed position whereby a media connector can be positioned there within.

As is known, this style of media connector port solves many of the interface problems posed by prior art devices. For example, since a typical media connector, such as an RJ-11, has a depth thickness of about 8 to about 11 mm and the depth thickness of a PCMCIA type II style modem is about 5 mm, a depth incompatibility problem exists that impacts upon the interfacing between the two devices. The XJACK® connector, however, has solved this depth incompatibility problem because the media conneceter port "pops-out" from the modem and the media connector is inserted vertically into the media connector port instead of horizontally as is done, via various assorted additional interface components, with other prior art devices.

The XJACK® connector has also solved additional problems such as: (i) the elimination of carrying along an extra interfacing device compatible with both the media connector port and the communications card modem; (ii) the elimination of ensuring a DAA in the modem is compatible with the computer; (iii) the elimination of physical interference between adjacent communication card modems in adjacent slots when the modem has an enlarged portion thereof larger than the conventional 5 mm thickness; (iv) the elimination of potential breakage of the media connector port when not in use; and (v) the elimination of protrusions beyond the normal dimensions of the computer so that the PC portfolio is more compatible with devices typically transporting portable PC's.

As depicted in FIG. 1, a typical embodiment of a sliding interface media connector port for directly interfacing with a media connector is depicted as slidably engaged between the upper and lower planar surfaces, or housing, of the modem 20. However, it should be appreciated that even further embodiments of the media connector port 28 suitable for slidably engaging with the housing and for accepting a media connector during use are contemplated within the scope of the present invention. These further embodiments are more fully described in U.S. Pat. Nos., 5,183,404, 5,336,099 and 5,338,210 and are expressly incorporated herein by reference.

It will be appreciated, however, that while the communications card 20 herein has been referred to as a modem, the communications card may additionally be a LAN, WAN, Ethernet card, etc., of PCMCIA Type I, II or III standards, or other sizes or configurations, suitable for mating with a computing system configuration such as a PC.

Configured about the retractable access portion 29 is an infrared transmitter and receiver pair 42 comprised of an infrared transmitter 44 and an infrared receiver 46. Preferably, an infrared isolation means (not shown) such as a barrier extending from the retractable access portion is positioned between the infrared transmitter 44 and receiver 46 to infrared isolate the transmitter from the receiver.

By so configuring the retractable access portion 29 with an infrared transmitter and receiver pair 42, the communications card 20 enables a computing system configuration, such as a PC, to achieve the means by which it can communicate using wireless, infrared technologies.

For example, by inserting the communications card 20 into a communications card slot of a PC, and by using circuitry on the fixed portion 40, the PC has twofold gained a media connector port and infrared port. Since PC's already typically require the use of PCMCIA cards such as modems, the retrofit of the PC to achieve infrared capabilities is substantially non-noticeable. The added economic expense is substantially non-existent.

As with the retractable access portion in its acceptance of a media connector, the infrared transmitter and receiver pair 42 is substantially confined within the upper and lower planar surfaces when the retractable access portion is in the retracted position and is substantially exposed when the retractable access portion is in the extended position (as shown).

A second, third and fourth pair of infrared transmitter and receiver pairs are also depicted in FIG. 1. The second and third pairs 48 and 50 are respectively located about one of the sides of the periphery of the generally rectangular shaped retractable access portion. The fourth pair 52 is substantially between the upper and lower planar surfaces 22, 24 of the communications card 20. In this manner, when the retractable access portion 29 is in an extended position, all infrared transmitter and receiver pairs, because of their arrangement on various facing surfaces of the communications card, combine to form a multi-directional infrared port for the PC.

During use, the infrared transmitters of each IR pair will disperse infrared signals in a wide angular pattern in a singular plane or planes depending upon their arrangement. In this manner, regardless of where the other IR communications port of another device is located, the infrared signals will locate the IR communications port and facilitate infrared transmissions without requiring precise juxtapositioning.

In a preferred embodiment, the infrared transmitter and receiver pairs are configured as infrared emitting diodes well known in the art whose emanations are in the electromagnetic spectrum with wavelengths of between about 0.75 to about 1000 micrometers. Generally, these wavelengths are slightly longer than visible light waves and shorter than radio waves.

Electrically connecting each of the infrared transmitter and receiver pairs (hereinafter collectively "pairs" or IR pairs) to the fixed portion, and ultimately to the PC, is a means for connecting each of the pairs to the electrical connection means 41. In this embodiment, this includes forming discrete wires 51 within the retractable access portion which connect between the ribbon cable and each infrared transmitter and infrared receiver, although only two such connections to IR pair 48 are shown.

It will be appreciated that additional IR pairs may alternatively be configured on the top and bottom planar surfaces 30, 32 of the retractable access portion separately or in combination with the IR pairs already located about the periphery thereof. To facilitate these additional IR pairs on the top and bottom planar surfaces and to prevent physical interference as the retractable access portion moves between the retracted and extended positions, it is contemplated that these additional IR pairs will be substantially flush mounted within the retractable access portion. These additional IR pairs could also be extended away from the planar surfaces so long as enough clearance existed between the upper and lower planar surfaces 22, 24 of the communications card as the retractable access portion maneuvers between the extended and retracted positions. Still other combinations of IR pairs could be incorporated herein and be within the intended scope of this invention. Thus, the foregoing should be construed as representative and not limitative.

It will be further appreciated, that as communications cards, like modems, are being increasingly used as both internal and external modems, that the computing system configuration using the communications card 20 may additionally be other devices such as PDA's, desktop computers, consumer electronic devices (such as games, video and audio recorders, cameras, etc.), special and general purpose computers, mainframes, etc.

With reference to FIG. 2, an exemplary circuit useful with the multi-directional infrared port of FIG. 1 is depicted. In this figure, the communications card 20 is configured in a well known fashion with a DAA 54, a CMOS switch 56, a codec 58, a DSP 60, a UART 62 and a (de)modulator 64. Further configured with the communications card 20 is a means for switching each of the infrared transmitter and receiver pairs 42, 48, 50, 52 between an active and an inactive state. The reasons for this switching will be described subsequently with reference to the method of use.

A preferred means for switching includes a CMOS switch 66 bi-directionally coupled between the (de)modulator 64 and uni-directionally coupled between each of the IR pairs 42, 48, 50, 52 and the DSP 60. The switch, however, could alternatively be any type of electronic switch and still be an equivalent structure within the scope of this invention. Such switches are known and are not described herein in detail.

Figure 4:
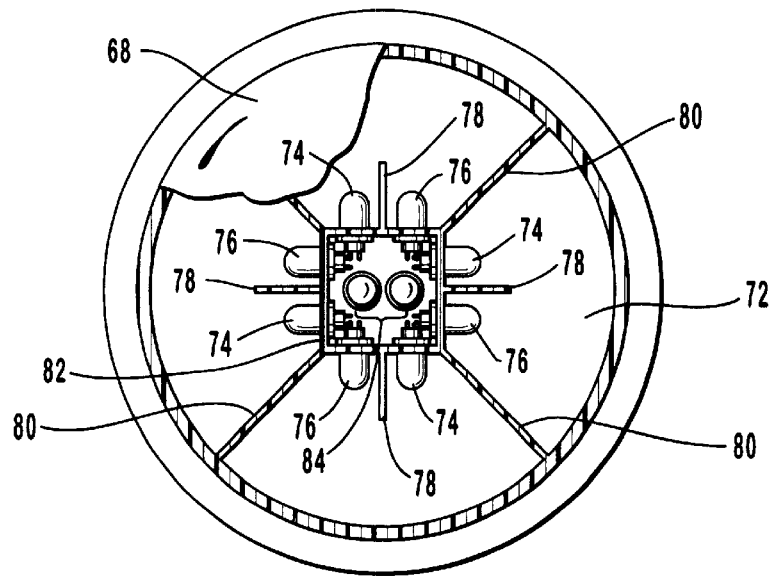
FIG. 4 is a top view of the multi-directional infrared port of FIG. 3.

Another preferred embodiment of the present invention is depicted in FIGS. 3 and 4. In this embodiment, a multi-directional infrared port is contained in a single housing 68, in the shape of a dome, and mechanically and electrically coupled to a PC 70 at a location suitable for providing unhindered line-of-sight infrared coverage such as along a top portion of the flip-up display screen.

The housing 68 is preferably a substantially infrared transparent material well known in the art. Within the housing, are a plurality of infrared transmitter and receiver pairs 72 (collectively "pairs" or IR pairs) each having an infrared transmitter 74 and receiver 76 infrared isolated by a first isolator 78. Each of the IR pairs are infrared isolated by a second isolator 80.

As depicted, the IR pairs are arranged about an interior portion 82 in a quadrant arrangement to provide a wide-angular dispersion pattern of infrared signals. In this embodiment, this pattern is substantially 360 degrees of infrared transmission coverage in a single plane.

Within the interior portion 82 is another infrared transmitter and receiver pair 84 which is also infrared isolated from every other pair by a third isolator (not shown) which extends from the interior portion 82. The interior portion 82 containing IR pair 84 may be substantially co-planar with the IR pairs that are quadrantly arranged or may be raised, lowered or otherwise offset, such as with an angle imparted to the interior portion. In this manner, additional degrees of infrared coverage are provided to the multi-directional infrared port. This multi-direction, however, can be achieved with numerous other arrangements and still be within the scope of this invention. For example, the quadrantly arranged IR pairs may alternatively be partitioned in a tri-directional, bi-directional, hexagonal or other poly-directional manner.

It will be also appreciated that the computing system configuration depicted, the PC 70, may alternatively be replaced with other configurations such as a cell phone, a printer, a scanner, a PDA or any other device having use for an infrared port that can potentially facilitate wireless communications.

Figure 3A:
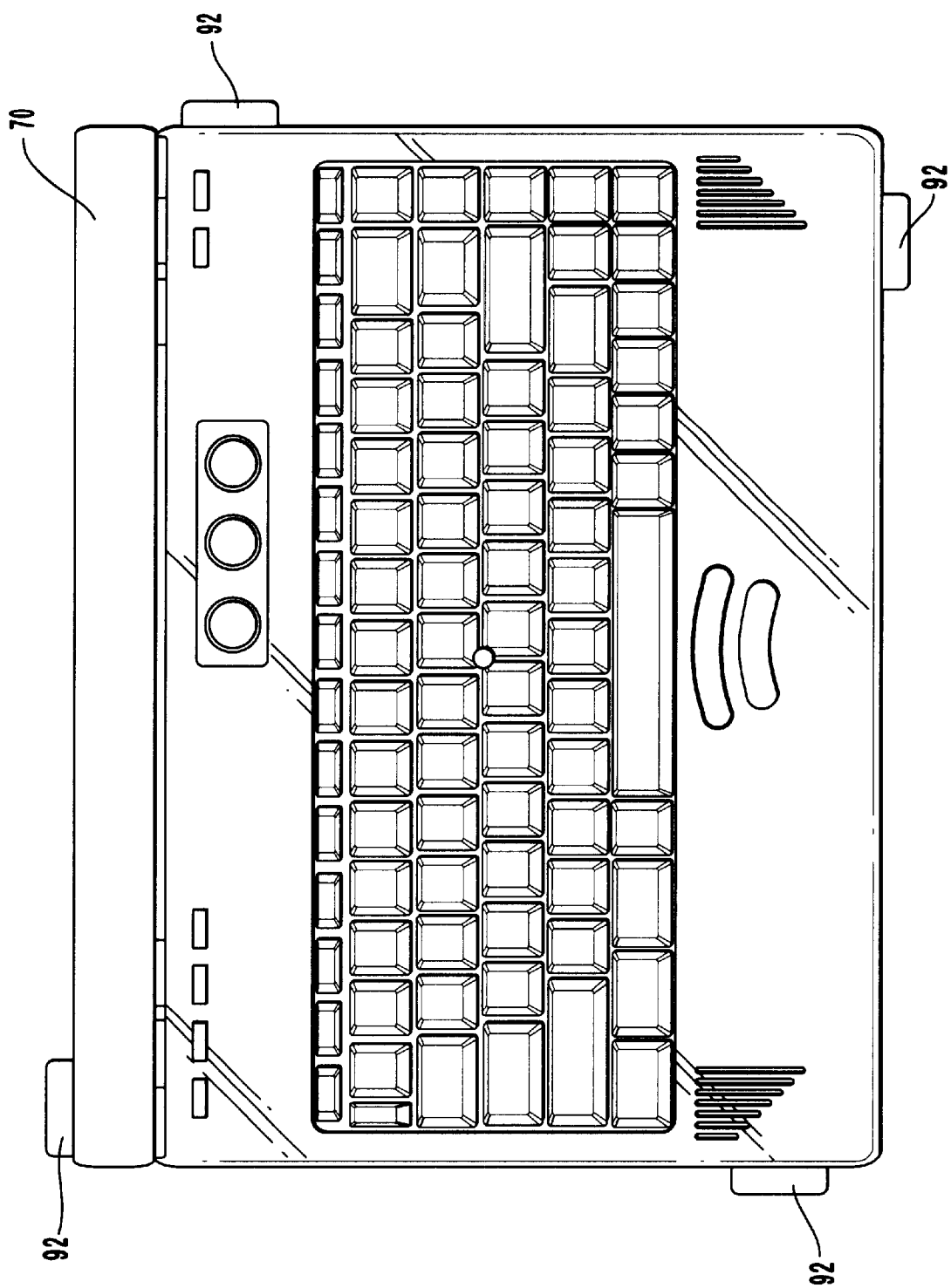
FIG. 3A is a top view of a computing system configuration having a plurality of infrared ports arranged multi-directionally thereabout.

With reference to FIG. 3A, an alternative arrangement of the multi-directional infrared port of the present invention includes a PC 70 having a plurality of IR ports 92 strategically arranged about the PC to achieve the multi-directional aspect of the present invention. The precise location of the IR ports 92, however, are merely suggestive and should not be construed as limiting. Likewise, this computing system configuration, PC 70, is readily adapted to one of the foregoing described alternative devices.

Figure 5:
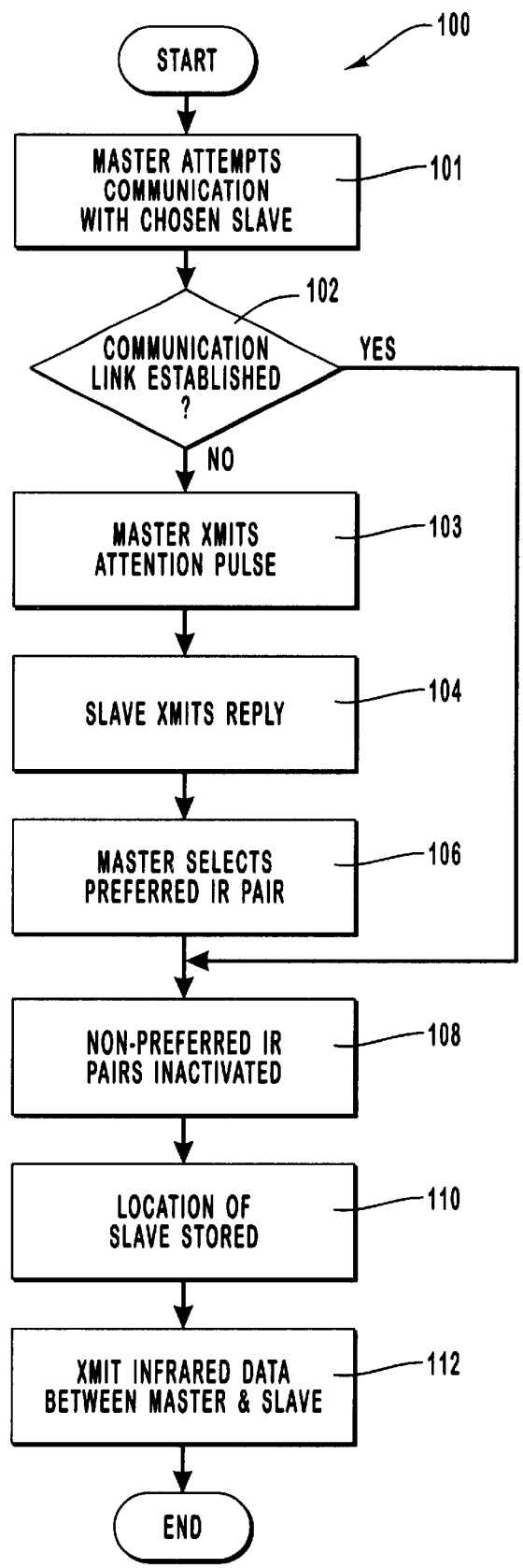
FIG. 5 is a flow diagram of the hierarchical operation for using the multi-directional infrared ports of the present invention.

With reference to FIG. 5, one preferred method of use, generally as 100, will be described for either of the foregoing multi-directional infrared port apparatus. Before describing the method, it will be appreciated that these steps are described for a system comprising at least two devices configured for infrared transmission and reception of infrared signals. One of the devices is a master device while another of the devices is a slave device. As more devices are included in this system, they become additional slave devices. Preferably, the master device is a computing configuration, such as a PC, configured with either the communications card, the domed multi-directional infrared port or the plurality of IR ports, positioned multi-directionally, about a computing system configuration.

At step 101, the master device attempts communication with a chosen slave device. If the communications link between the master and slave device can be established, a preferred IR pair is used for communicating with the slave device and all other IR pairs are inactivated at step 108. The reason a preferred IR pair is potentially available is because previous communications have already taken place between the devices and the preferred IR pair is known. As will be described subsequently, the preferred IR pair is selected from storage in a look-up table.

However, in the event that a communications link cannot be established between the master and slave device, or if no prior communications have ever been attempted, at step 103 the master device sends an attention pulse (an infrared signal) via each infrared transmitter of the infrared transmitter and receiver pairs to attract the attention of the slave device(s). It will be appreciated that regardless of the location of the slave devices, each device will receive the attention pulse because of the multi-directional dissemination of the infrared signal from the infrared transmitter as described previously.

Once received, the particular slave to which the master was attempting to contact, sends a reply. To discriminate between which particular slave is to reply, the attention pulse can be variously configured such that an information address may be broadcast to each of the slave devices whereby only the slave with that address will reply. Thereafter, the other slave devices having different addresses can quit seeking for infrared signals, be turned inactive, etc. Alternatively, the attention pulse and reply can be arranged in various other methodologies such as by transmitting infrared signals in bursts, in serial trains, according to unique timing sequences, according to various power levels, etc. These other methodologies, however, are not prescribed by this invention.

At step 106, the master device evaluates the reply and determines the "best" or preferred IR pair suited for communicating with the slave device. It will be appreciated that the best IR pair can be selected according to various criteria such as the strongest signal strength of the communication between the devices, the most accurate communication, the fastest communication, etc. This determination may be made according to line-of-sight arrangements via reflections of infrared signals from a common device such as an infrared reflector or even a wall or via any other communication paths available to infrared transmissions.

In determining the strongest signal strength communications, it is preferred to compare the measured strength of the reply received from the slave device amongst each of the infrared receivers of each infrared transmitter and receiver pair. Thereafter, the preferred IR pair will be the pair with the highest measured strength value.

In determining the most accurate communications, it is preferred to select the IR pair that enables a highest overall throughput rate, such as in characters per second. Then, as accuracy increases, fewer CRC errors occur, fewer retransmissions are required, etc.

In determining the fastest communications, it is preferred to measure time of response between the transmission of infrared signals occurring during the sending of the attention pulse to the time when the reply is received by each of the infrared receivers thereof. Thereafter, the preferred IR pair will be the pair having the shortest time difference between sending the attention pulse and receiving the reply. The differences in time between each of these receivers will be accounted for as a function of the location of each infrared receiver about the multi-directional IR port, the arrangement of infrared isolation barriers formed between each of the IR pairs and the communications path assumed by each infrared signal.

It will also be appreciated that when determining the best IR pair, that combinations of the foregoing can also be achieved. In particular, these combinations can be achieved by allowing more than one IR pair to be selected as the preferred or best pair. Thus, it may be that the location of the slave device is such that to achieve the strongest signal strength communications that two pairs are selected. As another example, it may be that two IR pairs each achieve the same accuracy or signal strength, or achieve advantage of one over the other, and vice versa, at which time both pairs could be selected as the preferred IR pair. Various decisional software could also be employed to effectuate a choice down to one IR pair or the other. It is also contemplated within the scope of this invention that the preferred IR pair can be altered on-the-go between numerous of the IR pairs. This would be accomplished by continuously monitoring various factors such as throughput rates, time-of-response, signal strengths, accuracy, etc. Still other various combinations are within the intended scope of this invention and can readily be achieved depending upon the infrared communication goals desired.

In practice, the determination of the master device to select the preferred IR pair may be made by various software, test equipment and measurement devices known or unknown in the art and may be digital, analog, combinations thereof, redundant systems of each or any other devices known or unknown for obtaining or making measurements. The exact devices are not prescribed herein.

At step 108, once the best or preferred IR pair(s) of the master device are selected for communications with the slave device, the other or non-selected IR pairs are switched to an inactive state. In this manner, the physical hardware drivers such as CMOS switch 66 (FIG. 2) are freed in their power requirements to drive all IR pairs. Inactivation of the other IR pairs may also occur in other well known means not described herein.

At step 110, once it has been determined which IR pair(s) are best suited for infrared communications with the slave device, the physical placement of the slave device is stored and associated with that IR pair(s). In a preferred embodiment, this association assumes the form of a look-up table stored in such a manner that the master device has convenient access thereto. It is advantageous to have stored the known location of the slave device and the best IR pair associated therewith because if the slave and master device do not change physical locations before the next infrared transmissions occur, which is typical for computing system configurations having a large footprint such as computers, printers, scanners, etc., the master device can immediately select the best IR pair suited for communicating with the slave device and readily achieve the fastest, most accurate and/or strongest signal strength communications therebetween.

Advantage over the prior art also occurs with other computing system configurations regardless of the size of footprint because desktops, for example, often dictate only a few logical ways of arranging related peripheral equipment. As such, readily mobile devices such as PC's and PDA's also lend themselves to storing physical locations and determining preferred IR pair(s).

Once the IR pair configured for the desired communications is selected, at step 112 infrared transmissions of infrared signals between the master and slave device occur as conventional transmissions.

It will be appreciated that while the preceding steps have been described chronologically, some of the steps may be performed in various other sequences. For example, the infrared transmissions of data (step 112) may occur before, after or simultaneously with the storing or recordation of the location of the slave device (step 110).

As another example of an alternative embodiment, additional steps, such as the measuring or tracking of error detection in the transmission of data may occur simultaneously, before or after the storing of the location. Other additional steps, while not shown, may include, but are not limited to: (i) alerting users to possible errors involved in the infrared transmission of data; (ii) prompting users to supply updated locations of slave or master devices to the look-up table whenever a physical location of these devices has been altered; (iii) prompting users to effectuate overriding actions; or (iv) any other similarly related steps intimated by performing the foregoing described steps.

Another step might require a handshaking procedure once the master and slave devices have determined the proper recipients are included in the infrared communications. Such handshaking between these devices might include passage of information regarding the make, model number, etc., of each device so that the master can better define the transmissions therebetween.

A comparison between conventional infrared transmission technologies and the present invention will reveal several advantages for utilizing a multi-directional infrared port as taught herein. For example, because the previously described multi-directional IR ports have infrared isolation between each of the IR pairs, substantially simultaneous infrared communications between a master and a plurality of slave devices can occur according to the preferred steps delineated in FIG. 5. In this manner, a master device is able to substantially simultaneous infrared communicate with a PDA, printer, scanner, phone, etc., to even further enhance performance thereof. This communication between a master and several peripheral devices may also be arranged as a substantially simultaneous communication via various time multiplexing schemes for biasing the infrared transmitter and receiver pairs on and off.

Another advantage the present invention affords over conventional IR communicating ports includes the essential assurance that the infrared transmissions are either the fastest, most accurate and/or strongest signal strength communications. Another advantage includes the readily available retrofit of existing computing system configurations with essentially necessary devices, such as communications cards, without requiring numerous pieces of computing equipment. This invention also reduces or eliminates the requirement of critical juxtapositioning between infrared communicating devices because the proper positioning is determined every time by the master device when selecting the preferred IR pair.

Along with measuring time of response, accuracy and signal strengths, it will be appreciated that additional measurements may be taken by the master device to afford even further advantage to the present invention. For example, once the preferred IR pair(s) are selected for infrared communications, power measurements may be taken of that IR pair to determine an appropriate current level needed to drive the IR pair. In this manner, if less current will still afford the advantages of time, accuracy and/or signal strength, it may be advantageous to reduce the power used to drive the selected IR pair. Over time, this provides added relief to battery supplies for PC's, for example.

Figure 6:
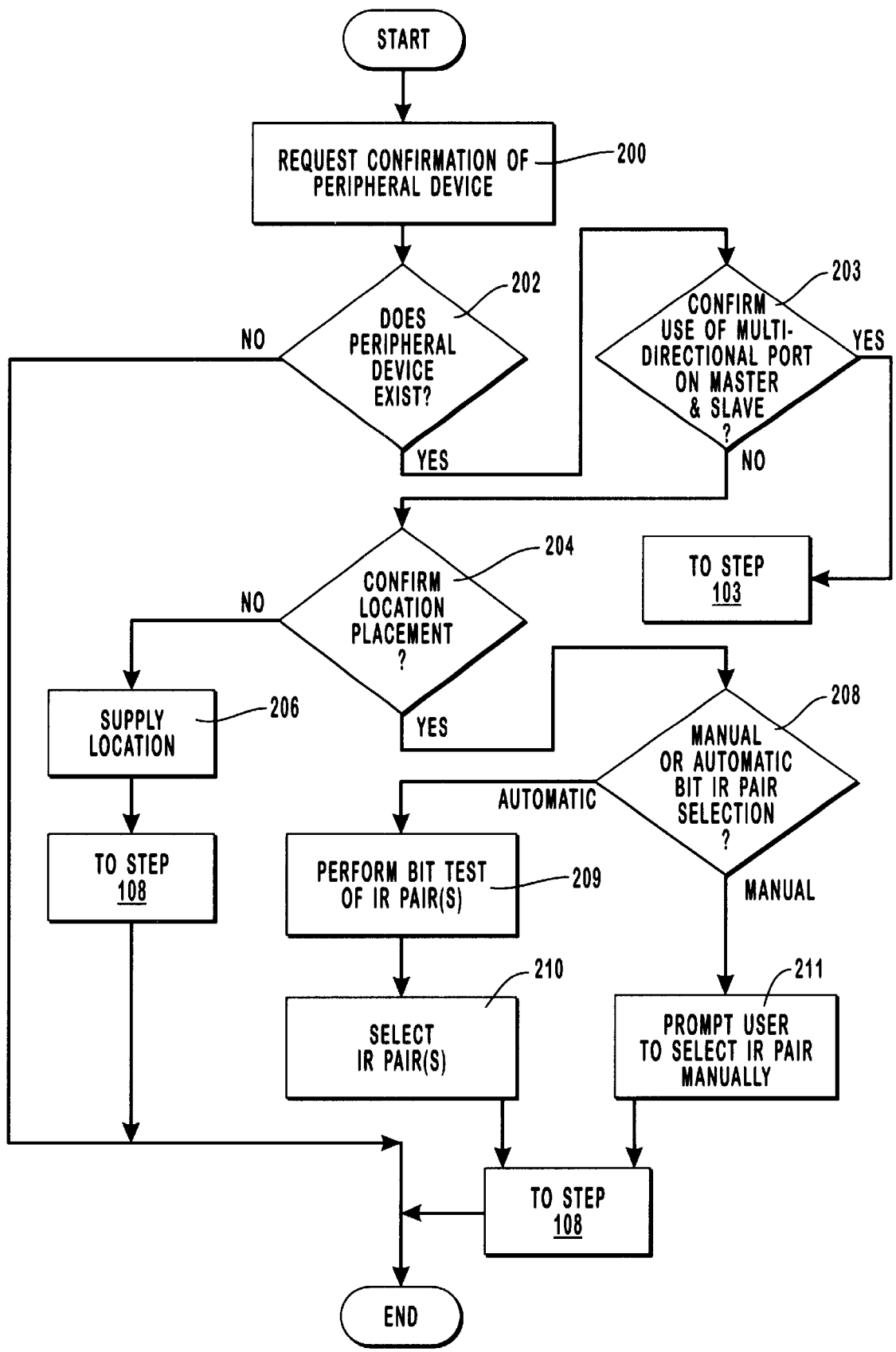
FIG. 6 is a flow diagram for executing troubleshooting procedures in accordance with a preferred embodiment of the present invention.

In the event that no reply is received by the master device from a slave device after the transmission of an attention pulse at step 104, a preferred troubleshooting methodology is described herein to isolate the problem. With reference to FIG. 6, after the attention pulse has been transmitted and no reply is seen by the master, a user may be prompted at step 200 to indicate or confirm whether or not a peripheral device (slave device) even exists.

Thereafter, at step 202 if no peripheral device exists, the user simply supplies a negative response and the attempted communications between the master and slave device is complete.

If a peripheral device is present, at step 203 the user is prompted to confirm whether the multi-directional port is being utilized between the master and slave device. If this confirmation is yes, communications are attempted in accordance with FIG. 5, beginning with step 103. If confirmation is no, at step 204 the user is prompted to confirm the location thereof. In this manner, since many peripheral devices like printers, scanners, PDA's, etc., infrequently change location, the exact location of the peripheral may already be known to the master device and the preferred IR pair may have been previously determined.

Thus, if the location placement of the peripheral device can be confirmed as being known, it is superfluous to try and determine the best infrared transmitter and receiver pair of the master device for communicating with the slave device and the troubleshooting procedures are better spent in attempting to isolate a further problem. As such, if the user confirms the known location of the peripheral device, at step 208 the user is prompted to provide whether an automatic built-in-test (BIT) or a manual selection of the IR pair would provide a solution.

If the user selects an automatic BIT, at step 209 the BIT test is performed for the IR pairs. At step 210, the IR pair is selected. In a preferred embodiment, this BIT test preferably ascertains power levels for transmitted and received infrared signals to determine which, if any, of the IR pairs are properly working. This test may also perform various internal software checks to ascertain whether information is being properly routed and/or whether various hardware devices, such as IC's, are functioning properly. Other test features are readily intimated by this process and can be ascertained by those skilled in the art.

If the user selects a manual selection, at step 211 the user is prompted to manually select an IR pair for conducting infrared communications between the master and slave devices. This pair supplied by the user can be a function of the results obtained from the BIT test, a predetermined default pair or any pair supplied by the user based upon choice. In either situation, the transmission of infrared data occurs as previously described by proceeding to step 108.

On the other hand, if the location placement of the peripheral device cannot be confirmed as known at step 204, the user is prompted to supply the location of placement for the peripheral device at step 206. Thereafter, the master device reattempts communication with the slave device as has already been described beginning with step 108.

Although the present invention has only been described in the context of the master device containing the multi-directional IR ports, it will be appreciated that the slave device could as well have the same or different multi-directional IR ports. In this way, each device could still be referred to as master and slave, but the slave could also initiate, on its own or in response to commands from the master, its own determination of its preferred IR pair or pairs. As a result, both the master and slave devices would be communicating via IR pairs preselected according to various desired infrared communications to even further enhance capabilities.

In the event a peripheral (slave) device is not configured to communicate via infrared communications as described herein, i.e. to initiate a reply in response to an attention pulse, the master device is preferably arranged to downgrade to a conventional form of communicating via bi-directional, unidirectional, duplexed or simple transmission of infrared signals through a single IR port. In this manner, tremendous flexibility is afforded the master device. Likewise, if a peripheral device, considered a slave device as described above, is configured for multi-directional infrared communications and the master is not, then the peripheral device is preferably provided a means to downgrade itself into a conventional infrared communications device. In a preferred embodiment, such a means includes the automatic or manual IR pair selection method as previously described.

The present invention is also intended to be compatible with traditional infrared communication standards such as well known IrDA standards like 1.1. While additional standards or protocols may be developed for initiating or responding to the attention pulse, this is not intended to disrupt or alter traditional and well accepted infrared transmission technologies. In this manner, costs are maintained as economically as possible during the manufacture and implementation thereof.

The present invention may be embodied in other specific forms without departing from its spirit or essential characteristics. Thus, the described embodiments are to be considered in all respects as illustrative only and not restrictive. The particular scope of the invention is indicated by the appended claims rather than by the foregoing description. All changes which come within the meaning and range of equivalency of the claims are to be embraced within their scope.

What is claimed is:

1. A multi-directional infrared transmission apparatus for providing an infrared port to a computing system configuration, comprising:

a communications card matable with said computing system configuration having:
   an upper and lower planar surface;
   a retractable access portion capable of being retracted into and extended from between said upper and lower planar surface of the communications card, wherein the retractable access portion conforms to the size of a PC card when in the retracted position, and wherein the retractable access portion comprises:
   a top planar face; and
   a bottom planar face; and
   at least two transmitter and receiver pairs configured about said retractable access portion, wherein the top planar face of the retractable access portion is configured with one of the at least two infrared transmitter and receiver pairs, and wherein the bottom planar face of the retractable access portion is also configured with one of the at least two infrared transmitter and receiver pairs.

2. The multi-directional infrared transmission apparatus according to claim 1, further comprising an aperture formed in said retractable access portion being sized and shaped to accept a portion of a media connector; and
  a contact wire in said aperture capable of being placed into electrical communication with said media connector.

3. The multi-directional infrared transmission apparatus according to claim 1, wherein a periphery of said retractable access portion is formed in a substantially rectangular shape, and wherein at least one additional transmitter and receiver pair is configured about at least one side of said substantially rectangular shaped periphery.

4. The multi-directional infrared transmission apparatus according to claim 1, further comprising a means for substantially infrared isolating an infrared transmitter from an infrared receiver of each one of the at least two infrared transmitter and receiver pairs.

5. The multi-directional infrared transmission apparatus according to claim 1, wherein said communications card further comprises another infrared transmitter and receiver pair substantially between said upper and lower planar surfaces.

6. The multi-directional infrared transmission apparatus according to claim 1, wherein s aid communications card further comprises electrical connection means for electrically coupling said retractable access portion to a fixed portion, said at least two infrared transmitter and receiver pairs being electrically coupled to said electrical connection means.

7. The multi-directional infrared transmission apparatus according to claim 1, wherein said communications card further comprises switching means for selectively causing said at least two infrared transmitter and receiver pairs to be electrically active .

8. The multi-directional infrared transmission apparatus according to claim 1, wherein said at least two infrared transmitter and receiver pairs are pairs of infrared emitting and receiving diodes.

9. A system for providing multi-directional infrared transmission coverage, said system comprising:
  a computing configuration having a slot therein;
  a communications card matable with said slot, said communications card having:
    an upper and lower planar surface;
    a retractable access portion capable of being retracted into and extended from between said upper and lower planar surface of the communications card, wherein the retractable access portion conforms to the size of a PC card when in the retracted position;
    at least two infrared transmitter and receiver pairs configured about said retractable access portion, wherein one of the at least two infrared transmitter and receiver pairs is disposed on the top planar face of the retractable access portion, and wherein one of the at least two infrared transmitter and receiver pairs is disposed on the bottom planar face of the retractable access portion such that said infrared transmitter and receiver pairs are substantially confined within said upper and lower planar surfaces of the communications card when said retractable access portion is in a retracted position and are substantially exposed when said retractable access portion is in an extended position; and
    an electrical connection means for electrically coupling said retractable access portion to a fixed portion, said fixed portion being capable of electrically communicating with said computing configuration, said at least two infrared transmitter and receiver pairs being electrically coupled to said electrical connection means; and
  a peripheral device having an infrared port, said infrared port configured for transmission of infrared signals to said infrared transmitter and receiver pairs and for reception of infrared signals emanating from said infrared transmitter and receiver pairs.

10. A multi-directional infrared transmission apparatus for providing an infrared port to a computing system configuration having a communications card slot therein, comprising:
  a PCMCIA type II architecture styled communications card matable with said communication card slot having:
    an upper and lower planar surface;
    a retractable access portion capable of being retracted into and extended from between said upper and lower planar surface of the communications card, wherein the retractable access portion comprises a top planar face and a bottom planar face, and wherein the retractable access portion conforms to the size of a PC card when in the retracted position;
    at least two infrared transmitter and receiver pairs configured about said retractable access portion, wherein one of the at least two infrared transmitter and receiver pairs is disposed on the top planar face of the retractable access portion, and wherein one of the at least two infrared transmitter and receiver pairs is disposed on the bottom planar face of the retractable access portion such that said infrared transmitter and receiver pairs are substantially confined within said upper and lower planar surfaces of the communications card when said retractable access portion is in a retracted position and are substantially exposed when said retractable access portion is in an extended position; and
    an electrical connection means for electrically coupling said retractable access portion to a fixed portion, said fixed portion being capable of electrically communicating with said computing system configuration, said at least two infrared transmitter and receiver pairs being electrically coupled to said electrical connection means.

11. The multi-directional infrared transmission apparatus according to claim 10, wherein each of the at least two infrared transmitter and receiver pairs being substantially infrared isolated from one another.

12. The multi-directional infrared transmission apparatus according to claim 11, wherein said communications card further comprises a switching means in electrical communication with said fixed portion for selectively causing each of said at least two infrared transmitter and receiver pairs to be electrically active or inactive.

13. The multi-directional infrared transmission apparatus according to claim 12, wherein one of the at least two infrared transmitter and receiver pairs is positioned substantially between said upper and lower planar surfaces.

* * * * *